Figure 10:
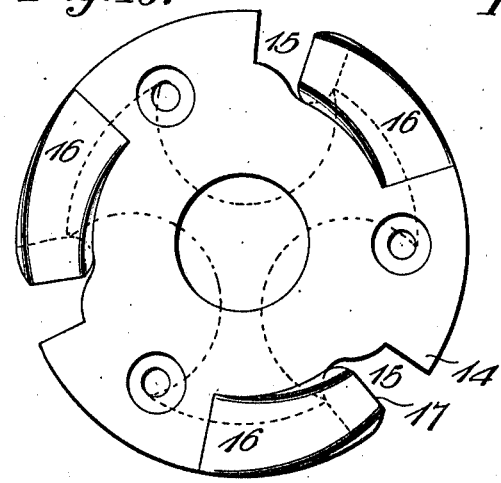

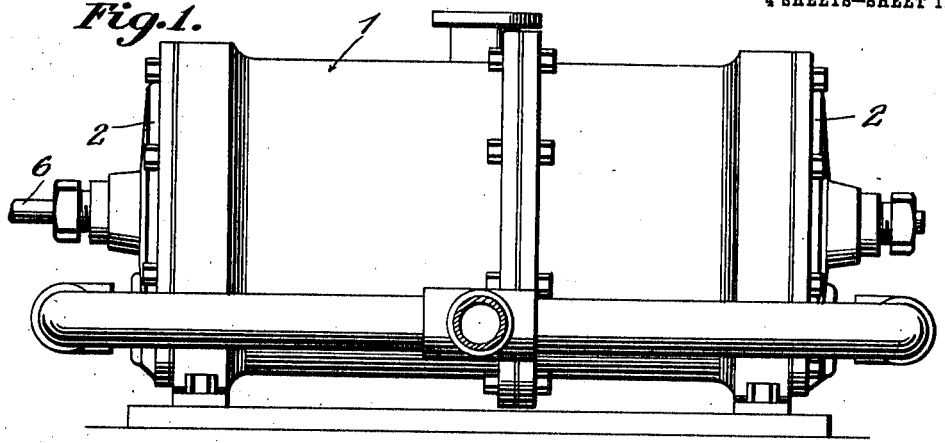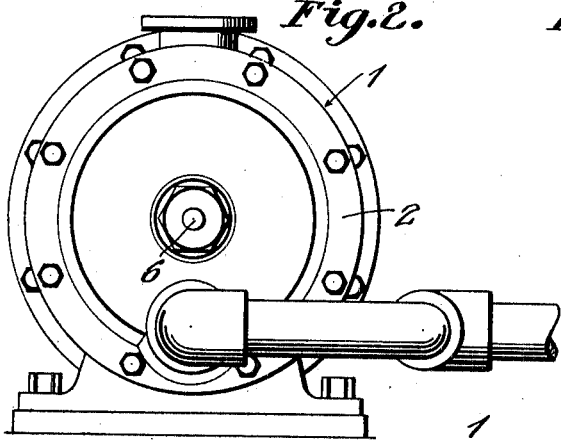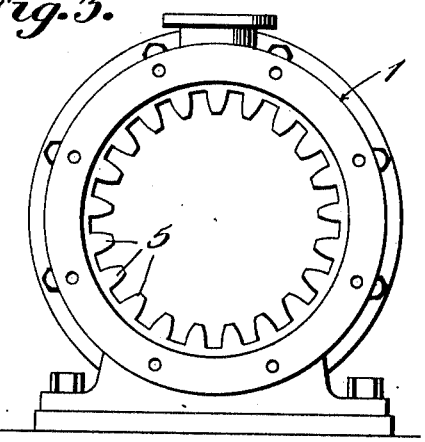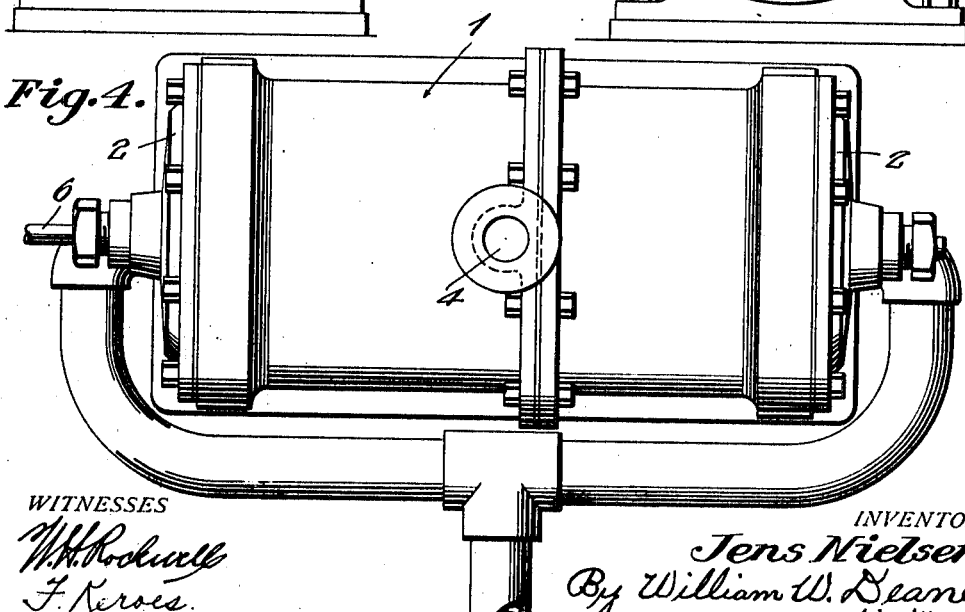

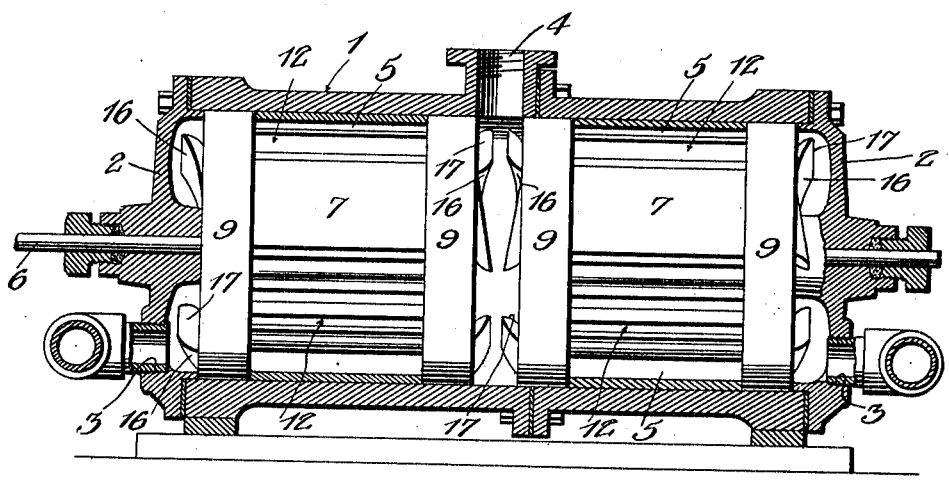

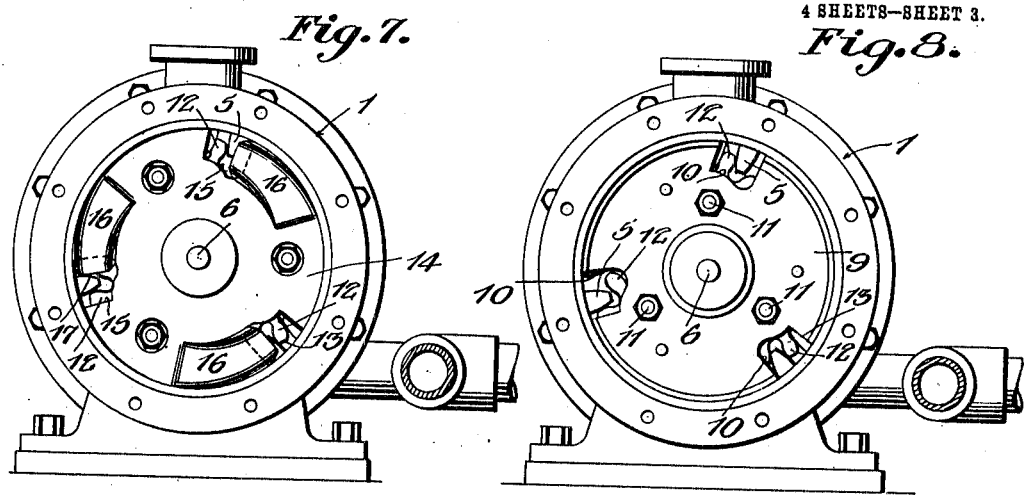
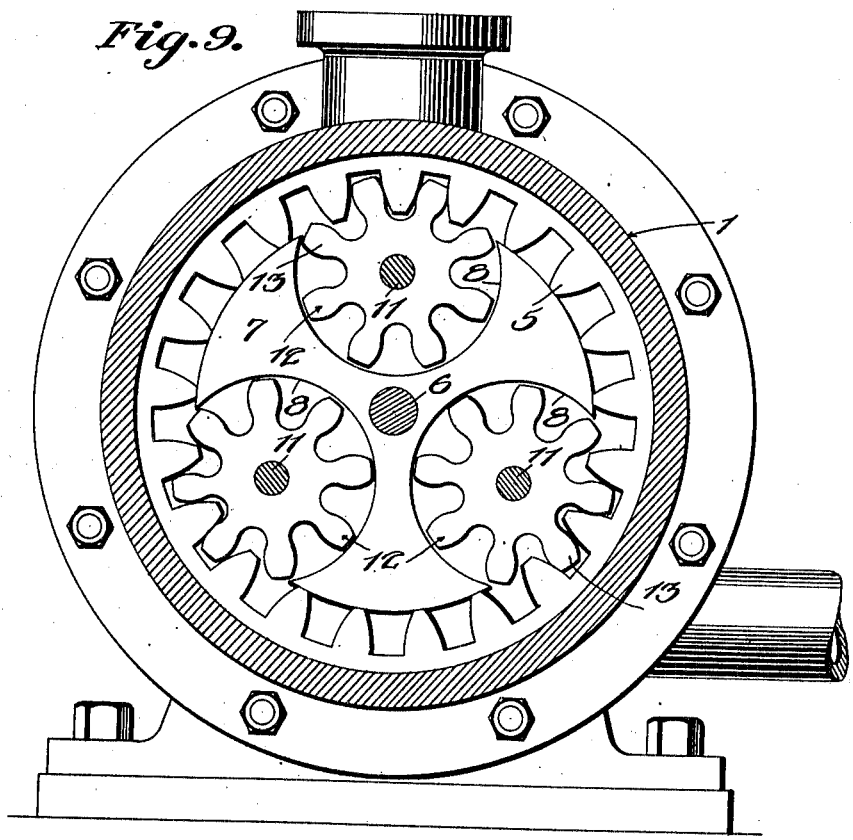

J. NIELSEN.
HORIZONTAL ROTARY ENGINE OR PUMP.
APPLICATION FILED DEC. 17, 1912.

1,088,836.

Patented Mar. 3, 1914.

4 SHEETS—SHEET 4.

WITNESSES

INVENTOR
Jens Nielsen
By William W. Deane
his Attorney

UNITED STATES PATENT OFFICE.

JENS NIELSEN, OF CEDAR FALLS, IOWA.

HORIZONTAL ROTARY ENGINE OR PUMP.

1,088,836.  Specification of Letters Patent.  Patented Mar. 3, 1914.

Application filed December 17, 1912. Serial No. 737,346.

*To all whom it may concern:*

Be it known that I, JENS NIELSEN, a citizen of the United States, residing at Cedar Falls, in the county of Blackhawk and State of Iowa, have invented certain new and useful Improvements in Horizontal Rotary Engines or Pumps, of which the following is a specification.

This invention has relation to horizontal rotary engines or pumps and it consists in the novel features hereinafter pointed out and claimed.

An object of the invention is to provide an engine or pump; the casing of which is primarily designed to be positioned with its long dimension horizontal, although it may be used in other positions if desired. This casing is provided upon its inner side with a series of teeth of peculiar configuration as will be hereinafter explained. A rotor is journaled in the casing and carries a series of rotatable pistons. These pistons are provided with teeth of peculiar configuration which mesh with the teeth of the casing and serve as means for forcing the liquid through the casing. The parts of the engine or pump are so arranged that the liquid may be forced in either of two directions with equal facility. The casing is provided at its opposite ends with openings which may be used as intake or exhaust ports as desired, and upon the rotor is mounted plates having ports which are positioned in predetermined relation with respect to the pistons.
These plates carry vanes which are adapted to encounter the liquid and lead the same through the ports in the plates into the casing so that the liquid is caught up by the teeth of the pistons and is forced through the pump.

In practice, it is preferable to arrange the engines or pumps in duplicate upon a single shaft in order that the thrust upon one rotor may counteract the thrust upon the other and thereby prevent any tendency upon the part of the rotors to move endwise in their respective casings.

The teeth in the casing taper gradually from their roots toward their crowns and being convexed at their sides while the teeth upon the pistons are broadest near their outer end portions and the spaces between the inner end portions of the teeth upon the pistons is more than sufficient to receive the inner end portions of the teeth upon the casing. Therefore ample room is provided to permit a certain amount of liquid to remain inactive between the teeth of the two parts to prevent pounding and trapping of the liquid and thereby facilitate the operation of the pump.

While the drawings illustrate the engine or pump as composed of two casings joined together at their ends, and two rotors mounted upon a single shaft journaled in the casings, it will be obvious that a single casing closed at its opposite ends may be employed and a single rotor may be used in the casing.

With these and other objects in view, the invention consists in certain novel features of construction as hereinafter shown and described, and then particularly pointed out in the claims and in the drawings illustrative of the preferred embodiment of the invention.

Figure 12:
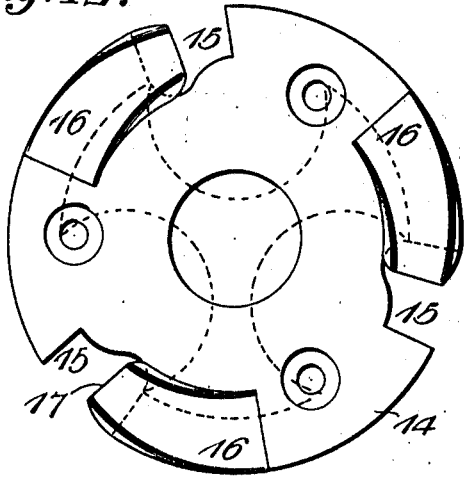
Figure 11:
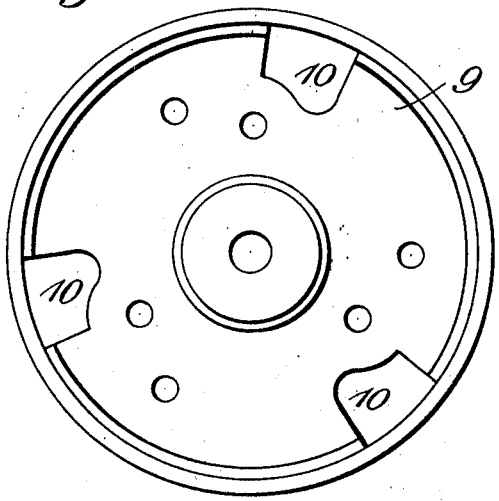
Figure 13:
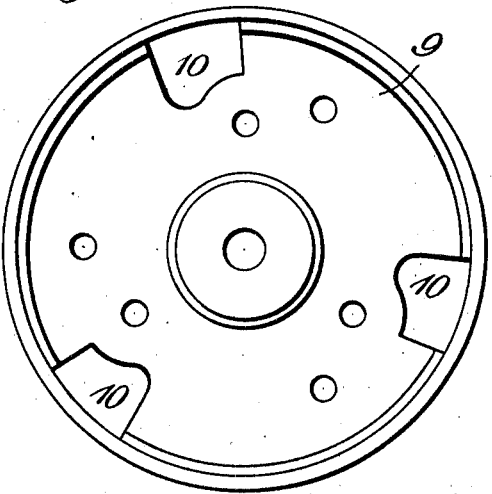
Figure 14:
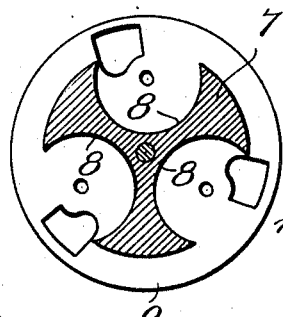
Figure 15:
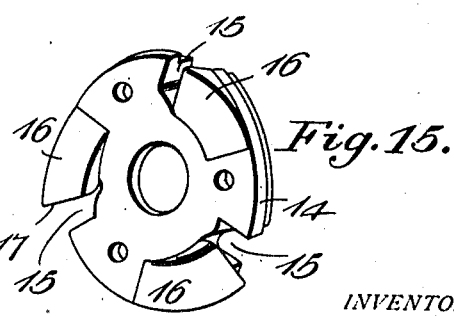

In the accompanying drawings:—Figure 1 is a side elevation of the engine or pump. Fig. 2 is an end elevation of the same. Fig. 3 is a similar view with one of the heads removed. Fig. 4 is a top plan view of the engine or pump. Fig. 5 is a vertical longitudinal sectional view of the same with the rotors in elevation. Fig. 6 is a vertical longitudinal sectional view of the same. Fig. 7 is an end view of the engine or pump showing parts removed and illustrates vanes in position at the edges of ports with which the pump is provided. Fig. 8 is a similar view with the vanes removed. Fig. 9 is an enlarged transverse sectional view of the engine or pump. Fig. 10 is a side view of a vane carrying plate used in the engine or pump. Fig. 11 is a side view of a ported plate used in the engine or pump. Fig. 12 is a view similar to that shown in Fig. 10 with the vanes oppositely disposed. Fig. 13 is a view similar to that shown in Fig. 11 with the ports oppositely arranged. Fig. 14 is a detail transverse sectional view of the rotor of the engine or pump. Fig. 15 is a perspective view of one of the vane carrying plates of the engine or pump.

Corresponding and like parts are referred to in the following description and indicated in all the views of the accompanying drawings by the same reference characters.

The engine or pump comprises a casing 1 which is closed at its ends by heads 2. The heads 2 are provided with openings 3 which may be connected in any suitable manner with a source of liquid supply. The casing 1 is provided preferably at its side and in the vicinity of one end with an opening 4 for outlet. These openings 3 and 4 may be used for either inlet or outlet ports. The casing 1 is provided upon its inner side with a series of teeth 5. These teeth are broadest at their bases or roots and taper gradually toward their inner ends and convexed at their sides, as most clearly shown in Fig. 9 of the drawings.

A shaft 6 is journaled for rotation in the heads 2 and any suitable means may be employed for rotating the said shaft. A rotor 7 is mounted upon the shaft 6 and is provided at its periphery with a series of pockets 8. These pockets are shown as being three in number although a greater or less number of pockets may be employed if desired.

Plates 9 are mounted at the opposite ends of the rotor 7 and the said plates are provided with ports 10 which communicate with the ends of the pockets 8. The ports 10 at one end of the rotor are out of alinement with the ports 10 at the opposite end thereof. These ports are positioned so that the ports at one end of the pockets 8 are located adjacent one side thereof, while the ports 10 thereof at the opposite ends of the pockets are located adjacent the opposite sides of the pockets.

Shafts 11 are carried by the plates 9 and traverse the lengths of the pockets 8. The said shafts are positioned in the centers of the pockets. Pistons 12 are journaled upon the shafts 11 and are provided with peripheral teeth 13. These teeth are broadest near their outer end portions and taper gradually toward their inner ends or roots. The teeth 13 are adapted to mesh with the teeth 5 as best shown in Fig. 9 of the drawing. The ports 10 hereinbefore described at one end of the rotor are located at one side of the axes of the shafts 11 while the ports 10 at the other end of the rotor are located at the opposite side of the axes of the said shafts. Plates 14 are also mounted upon the shaft 6 and are provided with ports 15 which register with the ports 10 in the plates 9. Vanes 16 are mounted upon the plates 14 at the edges of the ports 15 and the said vanes are provided with inner surfaces 17 which project slightly over the ports 15 and are approximately radially disposed with relation to the shaft 6. These surfaces 17 are also pitched at an angle to the axis of the shaft 6. The vanes 16 at one end of the rotor 7 have their surfaces 17 disposed opposite to the surfaces 17 of the vanes at the other end of the rotor.

As illustrated in Figs. 1, 4, 5 and 6 of the drawings the heads at the inner ends of the casings 1 are dispensed with, and the said casings are connected together at their inner ends and a single shaft 6 traverses the length of both cases. Two rotors 7 are mounted upon this shaft and the parts are so arranged that the resistance of the liquid upon one rotor counteracts or counterbalances the resistance upon the other rotor so that there will be no tendency on the part of the shaft 6 to move longitudinally. While this pump is designed primarily to operate in a horizontal position, it may be placed to operate effectually in any other position.

The operation of the machine when used as a pump is as follows: Presuming that the shaft 6 and rotor 7 are rotated in the direction in which the surfaces 17 of the vanes 16 at the outer ends of the rotors are disposed, the liquid flows into the casing 1 through the pipe which connects with the openings 3, and is caught up by the surfaces 17 of the vanes at the outer ends of the rotors. These vanes force the liquid through the ports 15 and 10 of the outermost plates into the spaces between the teeth 5 in the casing 1. At the same time the pistons 12 are carried around with the shaft 6 and the plates at the ends of the rotors 7 together with their ports are also rotated in the casing 1.

By reason of the fact that the teeth upon the pistons mesh with the teeth upon the inner side of the casing 1, the said pistons are rotated upon their shafts 11, and the liquid is drawn through the ports behind the axis of the pistons and moves out of the ports which are located in advance of the axis of the pistons. That is to say, if the pistons are rotating in one direction, the liquid is drawn in the pockets, at the ports behind the shafts 11 from the direction in which the teeth of the pistons which engage the teeth of the casing are moving, and the liquid moves out of the casing in advance of the shafts and the teeth of the pistons which mesh with the teeth in the casing. This action and relation of the teeth upon the pistons and in the casing creates proper suction to cause the liquid to move through the casing as indicated, and the teeth of the pistons which are located between the ports at the opposite ends of the pockets constitute abutments which prevent the liquid from flowing back through ports through which it enters the casing.

Should the shaft 6 be rotated in a direction opposite to that just above described, the liquid will be drawn into the casings through the opening 4 and will pass through the rotors 7 to the pockets in the opposite direction to that just above described and passes out of the casings 1 through the openings 3.

While the teeth in the casings 1 are shown in the drawing as being integral it is obvious that the said teeth may be made in section and inserted in the casings in any suitable manner. Therefore it will be seen that the pump may be operated to effectually move the liquid in either of two directions through the casings. Furthermore it will be seen that a pump of simple structure is provided and that the parts are peculiarly assembled and mutually coöperate with each other to move the liquid at the expenditure of a minimum amount of power to rotate the shaft 6 and the parts mounted thereon.

If desired roller bearings or any other form of antifriction bearing may be employed for journals in which the rotating parts of the pump or piston may operate.

The operation of the machine as an engine is as follows: The fluid entering the casing 1, through opening 4, passes through ports 10 in plate 9 into the spaces between the teeth 5 of the casing 1 and also into the spaces between the teeth 13 of the pistons 12. Here it encounters a closed chamber because the intermeshing of the teeth 5 with the teeth 13 forms abutments between the ports 10 at one end of the rotor 7 and the ports 10 at the other end of said rotor 7, now the fluid being impinged between the stationary teeth 5 and the movable teeth 13, it will push or roll the pistons 12 forward, thus imparting a revolving motion to the rotor 7 and its fixed shaft 6. The fluid between the teeth 5 soon encounters a port 10 at the other end of the rotor and escapes through opening 3. The fluid between the teeth 13 passes with the pistons around the periphery of the pockets 8 and also reaches a port 10 at the other end of the rotor, opposite the inlet port 10 and finds also an outlet at opening 3. This action being continuous as the abutment formed by the intermeshing of the teeth 5 and 13 is rotating, when in operation, and the said abutment thus formed is always between an inlet port 10 at one end of the rotor and an outlet port 10 at the opposite end of said rotor.

Having described the invention what is claimed, is:—

1. A rotary engine or pump comprising casings, a shaft journaled in the casings, rotors mounted upon the shaft, plates located at the ends of the rotors and having ports, vanes mounted upon the plates at the edges of the ports, the vanes at the opposite ends of the rotors being oppositely disposed, the casings having openings located beyond the outer ends of the rotor and having an opening located between the inner ends thereof.

2. A rotary engine or pump comprising casings, a shaft journaled in the casings, rotors mounted upon the shaft, plates carried at the ends of the rotors and having ports, vanes mounted upon the plates at the edges of the ports, the vanes at the opposite ends of the rotors being oppositely disposed and the vanes upon the corresponding ends of the rotors being oppositely disposed with relation to each other, the casings having openings located beyond the outer ends of the rotors and an opening located between the inner ends thereof.

3. A rotary engine or pump comprising a casing having openings at its opposite ends and provided upon its inner side with teeth, a shaft journaled in the casing, a rotor mounted upon the shaft and provided with a peripheral pocket, a piston journaled in the pocket and having teeth which mesh with the teeth in the casing, plates located at the ends of the rotor and having ports located at the ends of the piston, said ports being out of alinement with each other longitudinal of the piston, vanes located at the edges of the ports, the vane at one end of the piston being disposed opposite to the vane at the other end thereof.

In testimony whereof I affix my signature in presence of two witnesses.

JENS NIELSEN.

Witnesses:
A. M. PARKINS,
R. L. COWLES.